United States Patent
Sipila et al.

(10) Patent No.: US 7,389,121 B2
(45) Date of Patent: Jun. 17, 2008

(54) RADIO NETWORK RELOCATION

(75) Inventors: Juha P. Sipila, Nokia (FI); Sture Gustafsson, Espoo (FI)

(73) Assignee: Nokia Corporation, Espoo (FI)

( * ) Notice: Subject to any disclaimer, the term of this patent is extended or adjusted under 35 U.S.C. 154(b) by 672 days.

(21) Appl. No.: 10/828,241

(22) Filed: Apr. 21, 2004

(65) Prior Publication Data

US 2005/0148357 A1 Jul. 7, 2005

(30) Foreign Application Priority Data

Jan. 5, 2004 (GB) .................................. 0400081.6

(51) Int. Cl.
H04B 7/00 (2006.01)
(52) U.S. Cl. .................. 455/522; 455/436; 455/432.1; 455/452.1
(58) Field of Classification Search ................ 455/522, 455/69, 423, 425, 436, 561, 560, 432.1, 452.1; 370/342, 335, 441, 320
See application file for complete search history.

(56) References Cited

U.S. PATENT DOCUMENTS

| | | | | |
|---|---|---|---|---|
| 6,871,070 | B2 * | 3/2005 | Ejzak | 455/435.1 |
| 7,242,933 | B1 * | 7/2007 | Ahmavaara | 455/436 |
| 2002/0025820 | A1 * | 2/2002 | Fauconnier et al. | 455/452 |
| 2002/0082014 | A1 * | 6/2002 | Andersson et al. | 455/435 |
| 2003/0174686 | A1 * | 9/2003 | Willenegger et al. | 370/342 |
| 2004/0039910 | A1 * | 2/2004 | Isokangas et al. | 713/171 |
| 2005/0075122 | A1 * | 4/2005 | Lindoff et al. | 455/522 |
| 2005/0118993 | A1 * | 6/2005 | Roux et al. | 455/423 |

FOREIGN PATENT DOCUMENTS

EP 1 435 698 A2 7/2004

OTHER PUBLICATIONS

3GPP TSG RAN WG2 Meeting #40, "Proposed CR to 25.331 [R99] on TPC Combination Index in SRNC Relocation", R2-040003, Jan. 12-16, 2004, pp. 1-3.
TSG-RAN Working Group 1 Meeting No. 11, "LS to WG1 on the Definition of a RL Set", TSGRI-00-0363, Feb. 29-Mar. 3, 2000, pp. 1-2.
Wiberg, N. et al., "Combining of Power Control Commands During Soft Handover in WCDMA", IEEE, vol. 2, Sep. 7-10, 2003, pp. 1757-1760.

* cited by examiner

*Primary Examiner*—Tan Trinh
(74) *Attorney, Agent, or Firm*—Squire, Sanders & Dempsey, L.L.P.

(57) ABSTRACT

There is disclosed a method for serving radio network subsystem relocation from a first radio network controller to a second radio network controller for an established call to a user equipment, comprising transmitting a transmission power control combination index of a radio link established between the user equipment and the first radio network controller to the second radio network controller.

28 Claims, 2 Drawing Sheets

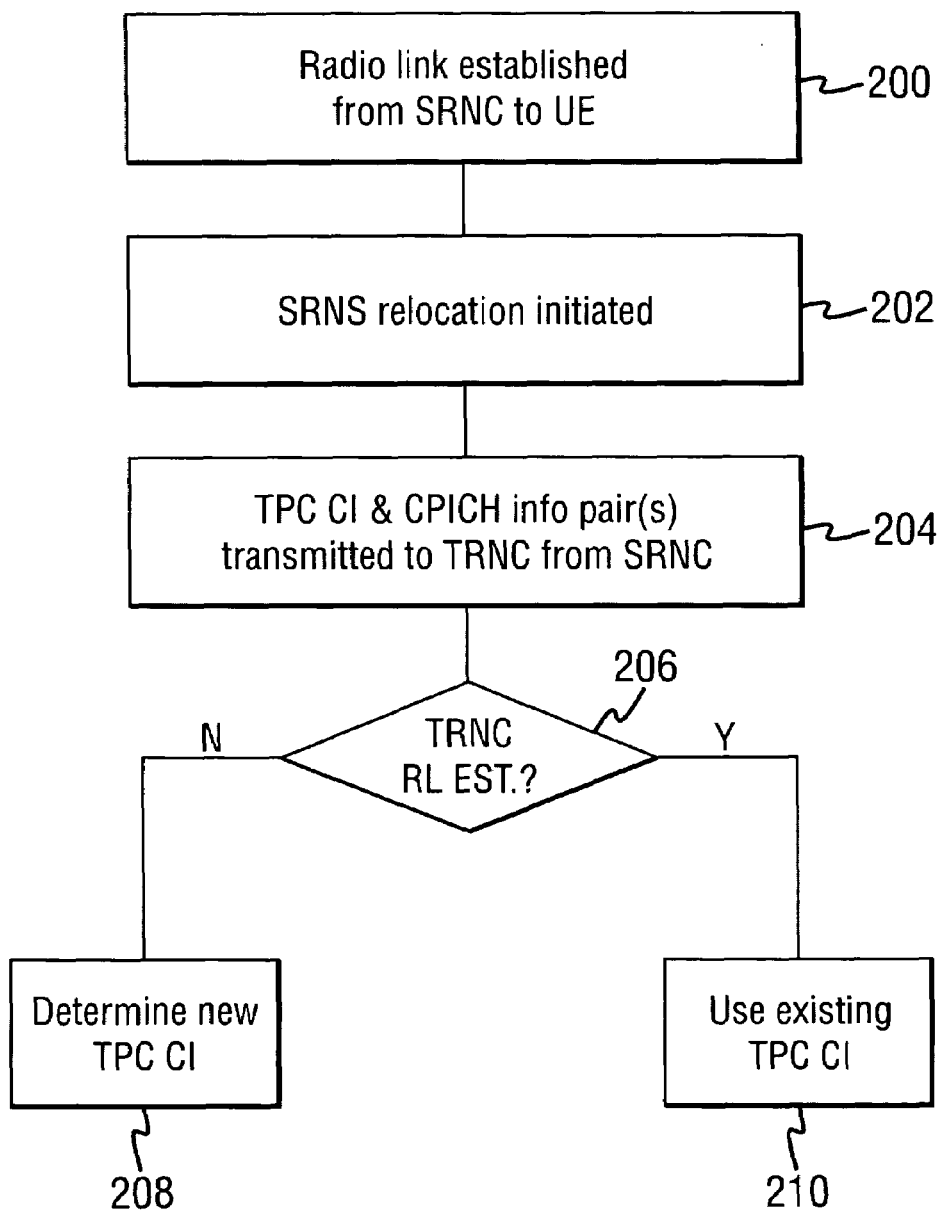

RADIO NETWORK RELOCATION

FIELD OF THE INVENTION

The present invention relates to serving radio network subsystem relocation in a mobile communications system.

BACKGROUND OF THE INVENTION

In the field of mobile communications, it is well know to provide for the relocation of the network access point of an established call to a user equipment as the user equipment roams in the network.

A TPC (transmission power control) CI (combination index) is an integer value in the range 0 to 5. Each time a radio link is established, a TPC CI is allocated for the link. A radio link is a connection from a radio network controller (RNC) to a user equipment (UE) via a base station. All radio links established via a given base station (Node B) must have the same TPC CI. If a new radio link is established using a Node B which has no previous radio links, then a new non-used TPC CI must be allocated for that Node B.

The UE uses the TPC CI to control the power for different radio links. Radio links from the same Node B are handled as a group from a power control point of view.

Whilst all radio links established via a given Node B have the same TPC CI, the various radio links established through the Node B are uniquely identified by a Primary common pilot channel (CPICH) info.

The TPC CI is established between the radio network controller (RNC) and the user equipment (UE), and it is not known by the base stations. The TPC CI is always allocated by the RNC that establishes a radio link.

When RNC relocation occurs, the new RNC does not know the TPC CI(s) of the radio links that were established by the original RNC, despite the fact that these radio links are transferred to the new RNC.

The TPC CI has a very limited value range, being an integer value in the range 0 to 5. Thus, when a new RNC starts to establish a new radio link to a new base station/user equipment after relocation it may accidentally allocate a TPC CI that is already in use. This creates a situation where the UE has the incorrect power control information. If the new RNC allocates a TPC CI that is already in use by another RNC, then the UE will assume that the new radio link is under the control of the same base station as the old radio link(s).

It is an aim of the present invention to provide an improved technique for serving radio network subsystem relocation.

SUMMARY OF THE INVENTION

In accordance with one aspect the invention provides a method for serving radio network subsystem relocation from a first radio network controller to a second radio network controller for an established call to a user equipment, comprising transmitting a transmission power control combination index of a radio link established between the user equipment and the first radio network controller to the second radio network controller.

The transmission power control combination index may be transmitted in a serving radio network subsystem relocation container. The transmission power control combination index may be transmitted on the IU interface.

The step of transmitting a transmission power control combination index may further include transmitting primary common pilot channel information.

The method may further include the step of allocating a transmission power control combination index for a radio link established from the second radio network controller to the user equipment.

Each radio link from a radio network controller to a user equipment may be established via a base station. If the base station for the link established from the second radio network controller to the user equipment is the same as that established for the link between the first radio network controller and said user equipment, the transport power control combination index received from said first radio network controller may preferably be used by second radio network controller. If the base station for the link established from the second radio network controller to the user equipment is different to that established for the link between the first radio network controller and said user equipment, the transport power control combination index used by the second radio network controller may preferably be different to that received from said first radio network controller.

In a second aspect the invention provides a radio network controller adapted, on serving radio network subsystem relocation, to receive from a further radio network controller from which a radio link is being transferred a transmission power control combination index of the radio link established between a user equipment and said further radio network controller.

The radio network controller may further be adapted to receive a transmitting primary common pilot channel information in combination with the transmission power control combination index.

The radio network controller may further be adapted to allocate a transmission power control combination index for a radio link established from the radio network controller to the user equipment.

Each radio link from a radio network controller to a user equipment may be established via a base station.

If the base station for the link established from the radio network controller to the user equipment is the same as that established for the link between the further radio network controller and said user equipment, the transport power control combination index received from said further radio network controller is preferably used by the radio network controller. If the base station for the link established from the radio network controller to the user equipment is different to that established for the link between the further radio network controller and said user equipment, the transport power control combination index used by the radio network controller is preferably different to that received from said further radio network controller.

In a third aspect the invention provides a radio network controller adapted, on serving radio network subsystem relocation, to transmit to a further radio network controller to which a radio link is to be transferred a transmission power control combination index of the radio link established between a user equipment and said radio network controller.

The radio network controller may be further adapted to transmit a primary common pilot channel information in combination with the transmission power control combination index.

In a fourth aspect the invention provides a communication system adapted for serving radio network subsystem relocation from a first radio network controller to a second radio network controller for an established call to a user equipment, comprising means at said first radio network controller for transmitting a transmission power control combination index of a radio link established between the user equipment and the first radio network controller to the second radio network controller; means at said second radio network controller for receiving said transport power control combination index, and means at said second radio network controller for determining a transmission power control combination index for a radio link to the user equipment in dependence on the received transport power control combination index.

The second radio network controller may be adapted to further determine the transmission power control combination index in dependence on whether the radio link is established through the same base station as the radio link between the first radio network controller and the user equipment.

BRIEF DESCRIPTION OF THE DRAWINGS

The invention is now described by way of example with reference to the accompanying drawings, in which:

FIG. 2 illustrates the method steps in a preferred embodiment of the invention.

DESCRIPTION OF PREFERRED EMBODIMENTS

Figure 1:
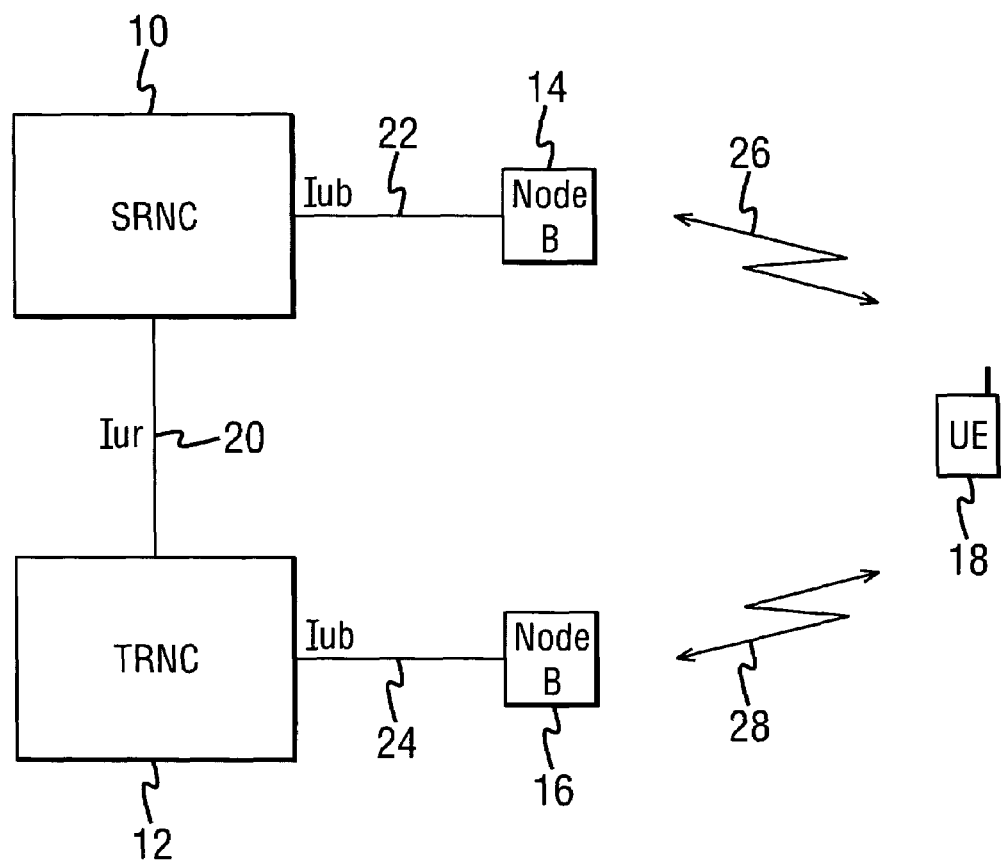
FIG. 1 illustrates part of the radio network subsystem in a UMTS system.

Referring to FIG. 1 there is illustrated an example of elements in a UMTS network architecture for describing an example implementation of the invention.

A source radio network controller (SRNC) 10 is connected to at least one base station, termed a "Node B", 14 via an interface 22, preferably an Iub interface. A target radio network controller (TRNC) 12 is connected to at least one Node B 26 via an interface 24, again preferably an Iub interface. The SRNC 10 and the TRNC 12 are interconnected via an inter-RNC interface 20, preferably being the Iur interface. A user equipment (UE) 18 may establish a radio communication with any radio network controller via an associated Node B. In the example of FIG. 2, the UE 18 may establish a connection to Node B 14 via a radio link 26, and/or may establish a connection to Node B 16 via a radio link 28. The UE 18 is representative only, and in practice a plurality of UEs may establish radio links.

For the purpose of discussion of an example implementation, the RNC 10 initially has an established radio link with the UE 18 via Node B 14. Hence the RNC 10 is identified as the source RNC. The RNC 12 is the RNC to which control of a call is to be transferred to due to roaming of the UE 18. Hence the RNC 12 is identified as the target RNC. The identification of the source and target RNCs enables the following description of the operation of the invention to be easily understood. However, it will be apparent that once the control of the call is transferred to a new RNC from an original RNC, the new RNC becomes the source RNC. Thus in general the invention relates to the transfer between RNCs, and the terms 'source' and 'target' should not be considered limiting in any way.

The establishment of the original radio link between the SRNC 10 and the UE 18 via the Node B 14 is not described. Establishment techniques for such radio links are well known in the art, and the invention does not propose any modification to such techniques. The invention is independent of any of the various techniques for establishing the original radio link.

Following the establishment of the radio link between the SRNC 10 and the UE 18 via the Node B 14, a TPC CI of 1, for example, is determined for the established radio link. This is denoted as "TPC CI 1". The established radio link is uniquely identified by a Primary CPICH Info. This is denoted as "CPICH info 1" for the established radio link.

A serving radio network subsystem (SRNS) relocation may occur due to the roaming of the UE 18. In an SRNS relocation, the RRC connection established between the SRNC 10 and the UE 18 via the Node B 14 is transferred completely to the TRNC 12 via the Node B 16. In such case, it is assumed that the UE 18 has roamed into a geographical area supported by the Node B 16. The techniques by which such relocation is controlled are known in the art, and outside the scope of the present invention. The invention does not propose any modification or adaptation to such techniques.

As is known in the art, during SRNS relocation an SRNS relocation container is transmitted from the SRNC to the TRNC via an IU interface. In accordance with the invention, the SRNS relocation container is modified to include an identity of the TPC CI in use for the radio link from the SRNC. This information is provided as a list of Primary CPICH Info/TPC CI pairs. This information is preferably provided on the IU interface to the target RNC 12 from the source RNC 10.

Thus the TRNC is provided with the value TPC CI 1 from the SRNC. The UE itself is already aware of the value TPC CI 1. The TRNC may then establish a new radio link, and is guaranteed not to establish a link based on a TPC CI value of TPC CI 1.

A radio link must always exist in the TRNC at the time the SRNC relocation occurs. As at the time of the SRNS relocation the TRNC has at least one established radio link, then the TPC CI or TPC CIs for the radio link to the UE 18 is that or are those of the established radio link. On completion of the relocation, if the TRNC establishes new radio links for a user now connected through the TRNC, in accordance with the embodiments of the invention the TPC CI(s) of the original SRNC is known. As such, in establishing any new radio links, the TPC CI(s) of the original SRNC can be taken into account by the TRNC, to ensure there is no conflict.

The technique of the present invention is summarised by the flow chart of FIG. 2. In a step 200, a radio link has been established from the SRNC 10 to the UE 18 via the Node B 14. In a step 202 a SRNS relocation is initiated, to transfer the network access point for the UE 18 from Node B 14 to Node B 16. In accordance with the invention, in a step 204 a TPC CI and Primary CPICH information pair is sent from the SRNC 10 to the TRNC 12 for each transferred radio link.

In SRNC relocation the target radio network controller always has an established radio link. The TPC CI is determined, however, to be different to the TPC CI of the radio link transferred from the SRNC if that radio link is supported by a different base station.

If in step 206 it is determined that the radio link to the UE 18 from the TRNC 12 uses the same base station as was previously used, then the same TPC CI is used for that link, as that TPC CI is used for all radio links through that base station, as denoted by step 210. If in step 206 it is determined that the radio link is established through a different base station, then the TRNC must establish a new TPC CI, i.e. different to that of the other base station, for the radio link, as denoted by step 208.

It should be noted that in the foregoing description, which relates to an exemplary embodiment, reference is made to the primary CPICH information being used. However, the invention and its embodiments is not limited to such use. For example, the secondary CPICH information may alternatively be used.

The invention has been described by way of example with reference to a particular embodiment. The invention is not, however, limited to any specifics of the described embodiments. The scope of the invention is defined by the appended claims.

The invention claimed is:

1. A method, comprising:
serving a radio network subsystem relocation from a first radio network controller to a second radio network controller for an established call to a user equipment; and
transmitting a transmission power control combination index of a radio link, established between the user equipment and the first radio network controller, to the second radio network controller.

2. The method according to claim 1, wherein the transmitting comprises transmitting the transmission power control combination index in a serving radio network subsystem relocation container.

3. The method according to claim 1, wherein the transmitting comprises transmitting the transmission power control combination index is on an interface unit.

4. The method according to claim 1, wherein the transmitting comprises transmitting primary common pilot channel information.

5. The method according to claim 1, further comprising:
allocating the transmission power control combination index for a the radio link established from the second radio network controller to the user equipment.

6. The method according to claim 5, wherein the serving comprises establishing each radio link from at least one of the first radio network controller and the second radio network controller the user equipment via a base station.

7. The method according to claim 6, wherein the allocating further comprises using the transmission power control combination index received from the first radio network controller by the second radio network controller, when the base station for the radio link established from the second radio network controller and te-the user equipment is the same as the base station established for the radio link between the first radio network controller and the user equipment.

8. The method according to claim 6, wherein the allocating further comprises using a different transmission power control combination index than received from the first radio network controller by the second radio network controller, when the base station for the radio link established from the second radio network controller and the user equipment is different from the base station established for the radio link between the first radio network controller and the user equipment.

9. An apparatus configured, on serving a radio network subsystem relocation, to receive from a network entity configured to transfer a radio link, a transmission power control combination index of the radio link established between user equipment and the network entity.

10. The apparatus according to claim 9, further configured to receive primary common pilot channel information in combination with the transmission power control combination index.

11. The apparatus according to claim 9, further configured to allocate a transmission power control combination index for a radio link established from the apparatus to the user equipment.

12. The apparatus according to claim 11, wherein the apparatus is configured to establish each radio link to the user equipment via a base station.

13. The apparatus according to claim 12, wherein the transmission power control combination index received from the network entity is used by the apparatus, when the base station for the radio link established from the apparatus to the user equipment is the same as the base station established for the radio link between the network entity and the user equipment.

14. The apparatus according to claim 12, wherein the transmission power control combination index used by the apparatus is different from that received from the network entity, when the base station for the radio link established from the radio network controller to the user equipment is different from the base station established for the radio link between the further radio network controller and the user equipment.

15. An apparatus configured, on serving a radio network subsystem relocation, to transmit to a network entity configured to receive a radio link, a transmission power control combination index of a radio link established between user equipment and the apparatus.

16. The apparatus according to claim 15, further configured to transmit primary common pilot channel information in combination with the transmission power control combination index.

17. A communication system, comprising:
a first radio network controller configured to transmit on serving a radio network subsystem relocation from the first radio network controller to a second radio network controller for an established call to user equipment, a transmission power control combination index of a radio link established between the user equipment and the first radio network controllers, to the second radio network controller;
wherein the second radio network controller is configured to receive the transmission power control combination index.

18. The communication system according to claim 17, wherein the second radio network controller is configured to determine the transmission power control combination index in dependence on whether the radio link is established through a base station which is the same as a radio link between the first radio network controller and the user equipment.

19. The communication system of claim 17, wherein said second radio network controller is configured to determine a transmission power control combination index for a radio link to the user equipment in dependence on the received transmission power control combination index.

20. A radio network controller, comprising:
a receiver configured, on serving a radio network subsystem relocation, to receive from a further radio network controller a transmission power control combination index of a radio link established between user equipment and the further radio network controller.

21. The radio network controller according to claim 20, wherein the receiver is further configured to receive a transmitting primary common pilot channel information in combination with the transmission power control combination index.

22. The radio network controller according to claim 20, wherein the radio network controller is further configured to allocate a transmission power control combination index for a radio link established from the radio network controller to the user equipment.

23. The radio network controller according to claim 22, wherein the radio network controller is configured to establish each radio link to the a user equipment via a base station.

24. The radio network controller according to claim 23, wherein the transmission power control combination index received from the further radio network controller is used by the radio network controller, when the base station for the radio link established from the radio network controller to the user equipment is the same as a base station established for a radio link between the further radio network controller and the user equipment.

25. The radio network controller according to claim 23, wherein the transmission power control combination index used by the radio network controller is different from that received from the further radio network controller, when the base station for the radio link established from the radio network controller to the user equipment is different from a base station established for a radio link between the further radio network controller and the user equipment.

26. A radio network controller, comprising:
a transmitter configured, on serving a radio network subsystem relocation, to transmit to a further radio network controller a transmission power control combination index of a radio link established between user equipment and the radio network controller.

27. The radio network controller according to claim 26, wherein the transmitter is further configured to transmit a primary common pilot channel information in combination with the transmission power control combination index.

28. A communication system, comprising:
a first radio network controller comprising transmission means for transmitting, on serving a radio network subsystem relocation from the first radio network controller to a second radio network controller for an established call to user equipment, a transmission power control combination index of a radio link established between the user equipment and the first radio network controller, to the second radio network controller.

* * * * *